(12) United States Patent
Anderson

(10) Patent No.: US 6,442,600 B1
(45) Date of Patent: Aug. 27, 2002

(54) METHOD AND SYSTEM FOR CENTRALIZED STORAGE AND MANAGEMENT OF ELECTRONIC MESSAGES

(75) Inventor: Eric D. Anderson, Village of North Hudson, WI (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/231,158

(22) Filed: Jan. 15, 1999

(51) Int. Cl.⁷ .............................................. G06F 15/16
(52) U.S. Cl. ...................................................... 709/217
(58) Field of Search ................................. 709/217–219

(56) References Cited

U.S. PATENT DOCUMENTS

| | | | | |
|---|---|---|---|---|
| 5,448,759 A | * | 9/1995 | Krebs et al. ................. | 455/54.1 |
| 5,751,813 A | * | 5/1998 | Dorenbos ..................... | 380/49 |
| 5,812,671 A | * | 9/1998 | Ross, Jr. ....................... | 380/49 |

OTHER PUBLICATIONS

Internet: Mailing Lists, pp. 10–12, 1993.*

* cited by examiner

*Primary Examiner*—John A. Follansbee
(74) *Attorney, Agent, or Firm*—Dorsey & Whitney LLP (57) ABSTRACT

A system for distributing electronic messages in an efficient manner using centralized storage and management. In particular, the system receives electronic messages to be distributed to one or more recipients, centrally stores a single copy of the message as well as various information about sending the message, and sends to each recipient a short indicator message to notify the recipient that the electronic message is available. The system then tracks and manages requests from the recipients to access the message by permitting access when appropriate, performing activities such as decrypting/encrypting the message if necessary, recording information about the access and about recipient instructions related to the message, archiving the message if necessary, and deleting the message when it is no longer needed. After a recipient receives an indicator, the recipient can use the indicator to access and review the message. The recipient can also provide various instructions about actions to be taken with the message corresponding to an indicator, such as to save or delete the message or to forward the message to another recipient. After all recipients have reviewed the message and no recipient has currently indicated to save the message (or all have indicated to delete the message), the system can then delete the single copy of the message.

10 Claims, 7 Drawing Sheets

METHOD AND SYSTEM FOR CENTRALIZED STORAGE AND MANAGEMENT OF ELECTRONIC MESSAGES

TECHNICAL FIELD

The present invention relates generally to communicating via electronic messages, and more particularly to a distribution system for electronic messages using centralized storage and management.

BACKGROUND OF THE INVENTION

Electronically-communicated messages ("electronic messages" or "electronic communications") such as email, paging messages, and transmitted documents Dec. 23, 1998 have become increasingly popular and pervasive in recent years. The ability to send an electronic message to multiple recipients provides for quick and efficient communication, and the use of electronic messages has become common in business settings.

While the use of electronic messages provides various benefits, current mechanisms for distributing such messages have various drawbacks. For example, when an electronic message is to be sent to multiple recipients, current messaging systems deliver a separate copy of the message from the sender's system to each of the recipients' systems (such as a pager to receive paging messages or a personal computer system to receive email, etc.). Each recipient system that receives the message is then responsible for storing and managing the message.

Unfortunately, this system of decentralized message storage and management creates various problems. One such problem is that each recipient system needs significant storage space to hold the various electronic messages for that recipient until the recipient has reviewed the message and no longer wants to save it. As electronic messages increasingly transport complex forms of data (e.g., an email with one or more other documents attached), the size of the messages and thus the required storage space for them only exacerbate the problem of insufficient storage. In addition, decentralized storage creates problems when non-recipient access to a message is needed. For example, in a business setting it may be necessary for users other than a recipient to have access to the recipient's messages, such as when the recipient is out of the office or is no longer employed at the business. Similarly, it may be necessary in some settings to create backup or archival copies of all important messages so that failure of a particular computer system does not cause locally-stored messages to be lost. In many network environments, central servers on the network are backed up regularly but individual client systems may not be.

In addition, if a user wishes to ensure that an electronic message be protected from users who should not have access to it, it may be necessary to encrypt the message. If the message is stored on the recipient system, it is likely that the encryption mechanism employed by the recipient may create a further barrier to access of the message by others with a legitimate need for access. For example, a particular user may use a private password or a private encryption key which is not known or available to other users. Finally, there are situations in which it may be necessary to perform an action on all copies of a message, such as if an administrator needs to delete all copies of a message because it is discovered that the message contains a virus.

SUMMARY OF THE INVENTION

Some embodiments of the present invention provide a method and system for distributing electronic messages in an efficient manner using centralized storage and management. In particular, the system receives electronic messages to be distributed to one or more recipients, centrally stores a single copy of the message as well as various information about sending the message, and sends to each recipient a short indicator message to notify the recipient that the electronic message is available. The system then tracks and manages requests from the recipients to access the message by permitting access when appropriate, performing activities such as decrypting/encrypting the message if necessary, recording information about the access and about recipient instructions related to the message, archiving the message if necessary, and deleting the message when it is no longer needed. After a recipient receives an indicator, the recipient can use the indicator to access and review the message. The recipient can also provide various instructions about actions to be taken with the message corresponding to an indicator, such as to save or delete the message or to forward the message to another recipient. In one embodiment, after all recipients have reviewed the message and no recipient has currently indicated to save the message (or all have indicated to delete the message), the system then deletes the single copy of the message.

In this manner, centralized storage and management of the electronic messages to be distributed provides a variety of benefits. Since only a short indicator is sent to each recipient, the recipient systems require only a small amount of storage space. In addition, each recipient system does not need the necessary software to save and manage the electronic messages. Instead, the recipient system need only be able to display a message and to send request and message action instructions to the system. In addition, central storage of the message provides easy access to the message when an appropriate authorized user needs access (e.g., for backup or when the recipient is unavailable). Finally, removal or modification of the message can be easily accomplished if such action is necessary.

In one embodiment, the system securely sends an electronic communication to multiple recipients, at least one of whom is unable to permanently store the electronic communication. The system first receives an indication of the electronic communication to be sent and receives an indication of the recipient users. The system then retrieves an encryption key for a server computer, encrypts the electronic communication with the retrieved server encryption key, and sends the encrypted electronic communication to the server. The server then receives the sent encrypted electronic communication and stores a single copy of the electronic communication. The server also creates a notification electronic communication including a reference to the electronic communication and sends a copy of the notification electronic communication to each of the recipient users. Upon receiving a request from a recipient user for the referenced electronic communication, the server decrypts the received encrypted electronic communication, retrieves a distinct encryption key for the recipient user, and encrypts a copy of the decrypted electronic communication with the retrieved distinct encryption key. Finally, the server sends the encrypted copy to the recipient user for temporary storage while the sent encrypted copy is reviewed.

Similarly, one embodiment of the system allows a designated recipient to receive an electronic communication from a server that stores a single copy of the electronic communication. The recipient first receives an electronic communication notification from the server that references the electronic communication, with the electronic communication notification distinct from the electronic communication.

The recipient then requests from the server the referenced electronic communication, and receives from the server a copy of the requested electronic communication. When access to the electronic communication is no longer desired, the recipient indicates to the server to delete the electronic communication, and the server after receiving indications from all recipients to delete the electronic communication deletes the single stored copy of the electronic communication.

DETAILED DESCRIPTION OF THE INVENTION

An embodiment of the present invention provides a method and system for distributing electronic messages in an efficient manner using centralized storage and management. In particular, the Message Distribution Server (MDS) system receives electronic messages to be distributed to one or more recipients, centrally stores a single copy of the message as well as various information about sending the message, and sends to each recipient a short indicator message to notify the recipient that the electronic message is available. The MDS system then tracks and manages requests from the recipients to access the message by permitting access when appropriate, performing activities such as decrypting/encrypting the message if necessary, recording information about the access and about recipient instructions related to the message, archiving the message if necessary, and deleting the message when it is no longer needed.

The indicator messages sent to the recipients can take a variety of forms. For example, the indicator for an email could include the sender and the subject line only, the first few lines from the message body, or message attributes such as size or importance. Each indicator also includes a reference to the corresponding message that will allow the message to be accessed. The information about sending the message ("message sending information") stored by the MDS system can also take a variety of forms, and can include both information supplied by the sender of the message as well as information generated by the MDS system. In addition, if recipients have previously supplied preference information about receiving indicators and messages, the MDS system can access this information. The sender supplies message sending information that includes one or more recipients, and also can include optional information such as minimum or maximum expiration time periods for which the message should be stored or restrictions on access by some or all recipients (e.g., recipient 1 can only access the message once and recipient 2 is not allowed to see any of the attached documents). Alternatively, the MDS system could instead generate information such as minimum or maximum expiration time periods or recipient access restrictions. The MDS system can also record information such as the time that the indicators are sent out, the time and duration of each access by a recipient, and recipient instructions such as to save or delete the message.

After a recipient receives an indicator, the recipient can use the indicator to access the message. In one embodiment, a recipient receives both indicators and locally-stored messages, and the available messages and indicators are displayed in such a manner that the distinction between them is indistinguishable to the recipient. The reference to the corresponding message in an indicator can allow the message to be accessed either manually (e.g., clicking on a link such as a URL) or automatically (e.g., retrieving the message when the indicator is selected). The recipient can also provide various instructions about actions to be taken with a message corresponding to an indicator, such as to save or delete the message or to forward the message to another recipient. An instruction to delete the message has an immediate effect on the indicator stored locally on the recipient system (i.e., the indicator is deleted or no longer displayed to the user).

A message action instruction can also affect the single copy of the electronic message stored by the MDS system. In one embodiment, after all recipients have reviewed the message and no recipient has currently indicated to save the message (or all have indicated to delete the message), the MDS system deletes the single copy of the message. In an alternate embodiment, the MDS system may delete a message when the end of a maximum time period has expired, regardless of whether or not the message has been reviewed by all the recipients or whether recipients had requested that the message be saved. In yet another embodiment, the MDS system may retain the message stored on the central server even after all recipients have reviewed the message and requested that it be deleted, such as when a copy of the message is needed for archival or other purposes. A message action instruction to forward the message to another recipient can also affect the message, such as by having the MDS system add the new recipient to the message sending information and possibly restart a maximum or minimum expiration time period.

In this manner, centralized storage and management of the electronic messages to be distributed provides a variety of benefits. Since only a short indicator is sent to each recipient, the recipient systems require only a small amount of storage space. In addition, each recipient system does not need the necessary software to save and manage the electronic messages. Instead, the recipient system need only be able to display a message and to send request and message action instructions to the MDS system. In addition, central storage of the message provides easy access to the message when an appropriate authorized user needs access (e.g., for backup or when the recipient is unavailable). Finally, removal or modification of the message can be easily accomplished if such action is necessary.

Figure 1:
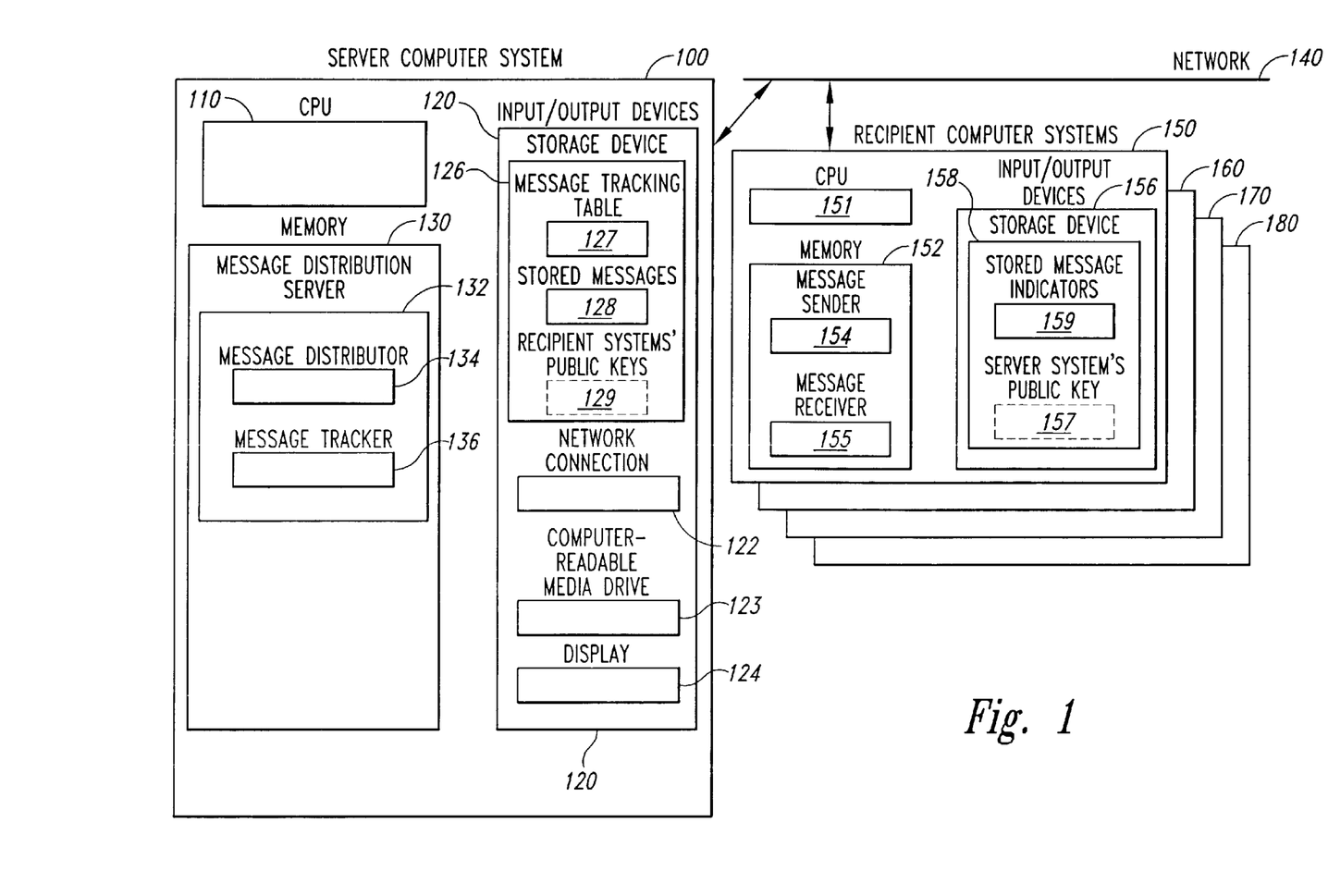
FIG. 1 is a block diagram illustrating an embodiment of the Message Distribution Server system of the present invention.

FIG. 1 illustrates a server computer system 100 suitable for executing the Message Distribution Server (MDS) system as well as recipient client computer systems 150, 160, 170, and 180 suitable for receiving and sending electronic messages. In the illustrated embodiment, the server computer system and recipient computer systems are connected via network 140, although any transmission medium (e.g., circuit-based telephone lines, packet-based computer lines, wireless RF, etc.) can be used for the transmission of the electronic messages. The server computer system includes a CPU 110, input/output devices 120, and a memory 130. The input/output devices include a network connection 122, a computer-readable media drive 123, a display 124, and a storage device 126, with the storage device including a Message Tracking Table 127, a variety of stored messages 128, and optionally the public encryption keys for the various recipient systems. In the illustrated embodiment, public and private encryption keys are assigned to systems rather than to specific users. The MDS system 132 is executing in memory, and it includes a Message Distributor 134 component and a Message Tracker 136 component. Recipient computer system 150 similarly includes a CPU 151, a memory 152, and input/output devices 156. The input/output devices include a storage device 158 which includes multiple stored message indicators 159 and optionally a public encryption key for the server computer system. A Message Sender 154 component and Message Receiver 155 component are executing in memory.

Use of the MDS system begins when a user (e.g., a user of a recipient computer system) uses a Message Sender to supply an electronic message to the MDS system. In addition to supplying the message, the sender of the message identifies one or more recipients for the electronic message, and can specify various optional message sending information. The sender can also indicate whether the message should be transmitted in an encrypted manner. If the message is to be encrypted, the Message Sender retrieves the server system's public encryption key and uses the key to encrypt the message before sending the message to the MDS system. While many encryption schemes must leave recipient information unencrypted to enable message delivery, the MDS system can encrypt even the ultimate message recipients since all messages are first sent to the MDS system. If the message is not to be encrypted, the Message Sender sends the unencrypted message directly to the MDS system.

When the MDS system receives a message to be distributed, the MDS system first decrypts the message with the server system's private key if the message is encrypted, and then stores the message on the storage device. In an alternate embodiment, the message can be stored in an encrypted manner on the storage device if access to the server computer system is not secure. The MDS system also notifies the Message Distributor and Message Tracker components and supplies any received message sending information to them.

The Message Distributor component is responsible for forwarding an appropriate message indicator to each of the recipients to notify them of the electronic message, and for storing appropriate message sending information in the Message Tracking Table. As is discussed in greater detail with respect to FIG. 2, the Message Tracking Table stores information that instructs the MDS system on how and when to send messages and indicators to recipients and stores records of when actions were taken or of instructions from recipients. The Message Distributor first determines for each recipient (e.g., from the message sending information) whether the message indicator is to be encrypted when the indicator is sent to that recipient. If so, the Message Distributor retrieves the public encryption key for the recipient's computer system and uses the key to encrypt a copy of the message indicator. The indicator, whether encrypted or not, is then transmitted to the appropriate computer system for the recipient. In addition, the Message Distributor creates an entry in the Message Tracking Table for each message. This entry will include the message sending information and access information for the message, including appropriate message action instructions from recipients.

The message indicators sent to recipients can take a variety of forms, and in some embodiments can vary for each recipient based on their preferences, their access privileges, or the message sending information. For example, only the sender of the message and the subject line could be included in a message indicator, or a computer-generated summary of the message could instead be included. The message indicators include a reference to the stored electronic message that will allow the message to be accessed. In one embodiment, the reference could be a selectable link to the stored message (e.g., a URL), while in another embodiment the reference may be a unique ID. Note that if the message indicator is encrypted, even the limited information in the indicator will be secure during transit to the recipient.

When a recipient computer system receives a message indicator from the MDS system, the Message Receiver component first determines if the message indicator is encrypted. If so, the Message Receiver retrieves the recipient computer system's private key and decrypts the message. The Message Receiver then stores the decrypted message indicator on the recipient computer system. In an alternate embodiment, the message indicator could be stored in an encrypted fashion and could be decrypted when accessed by the recipient. The Message Receiver then displays to the recipient the various message indicators currently available on the recipient computer system, displaying some or all of the information available in each message indicator.

When the user indicates that they wish to review a message corresponding to a message indicator, the Message Receiver uses the message reference information in the message indicator to retrieve the stored message from the server computer system. In one embodiment, the Message Receiver retrieves the stored message without the intervention of the MDS system, while in another embodiment the request is sent to the MDS system for approval and performance. If the Message Receiver component directly accesses the message stored on a server computer system, the Message Receiver notifies the MDS system that the message is being accessed by the recipient. The Message Receiver can also supply other information to the MDS system related to the message access, such as the duration of message review or the types of interactions performed by the recipient with the message.

In addition to reviewing messages, the recipient can select a message or message indicator and indicate a message action to be taken, such as saving, deleting, or forwarding the message. In some embodiments, the recipient can also indicate that a message be stored locally if the recipient computer system has the required space. The user can also indicate other actions commonly performed on messages, such as to save the message in a particular folder. In some embodiments, such actions will be performed on the MDS system (e.g., by adding appropriate information in the Message Tracking Table or by storing a copy of the message in a physically distinct server location) while in other embodiments the appropriate action can be performed on the recipient's computer system. Defaults can also affect whether various actions are available or needed (e.g., if a default behavior is to save a message unless it is explicitly deleted, a save instruction from a recipient is not necessary). When a recipient indicates that a message is to be deleted, the Message Receiver removes the associated message indicator from the recipient computer system.

Figure 2:
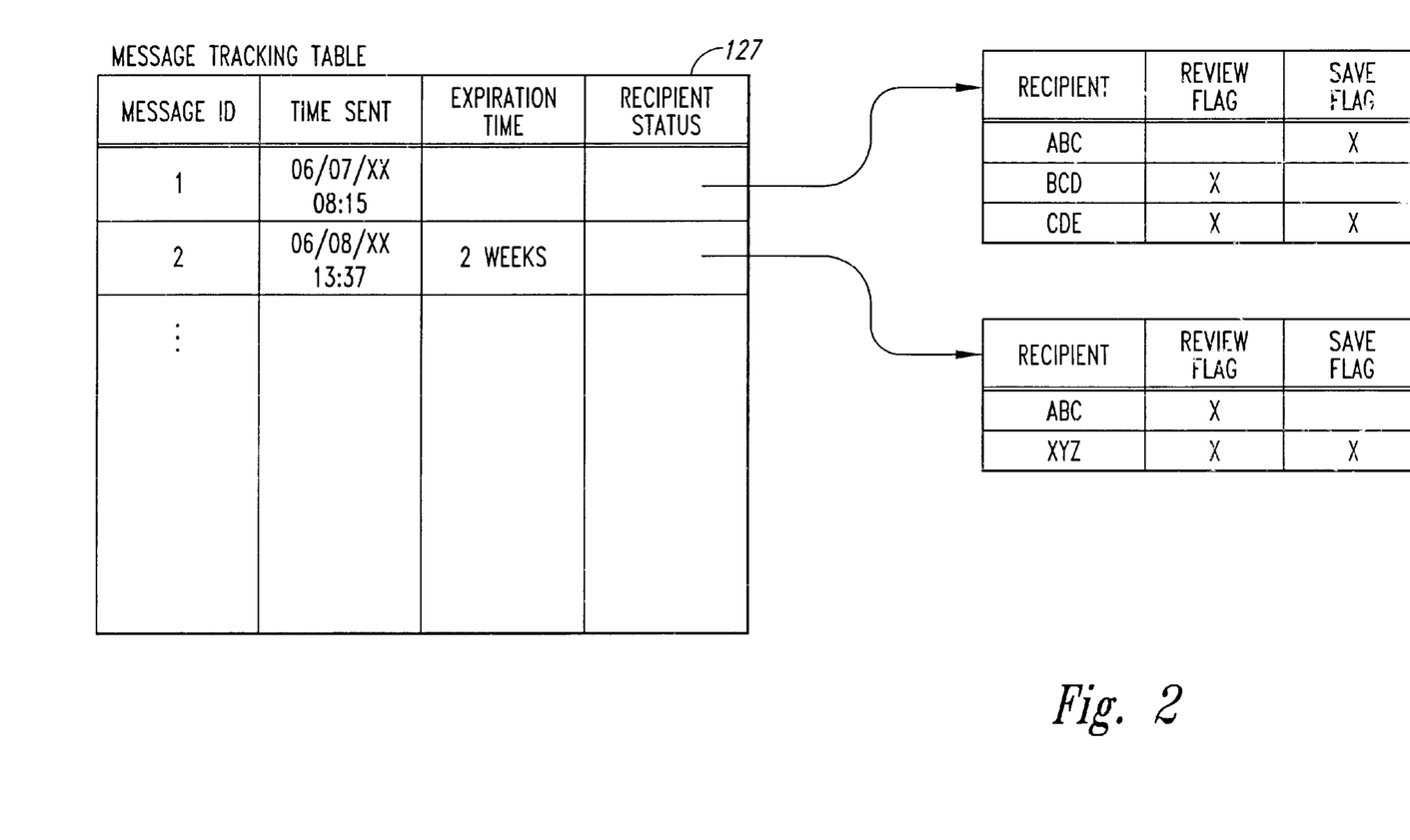
FIG. 2 is an example of a Message Tracking Table.

The Message Tracker component receives requests, instructions and other information from Message Receiver components and tracks the status of the various messages. If a request to review a message is received, the Message Tracker can determine whether the requesting user has access to review the message. If so, the Message Tracker will send the message to the recipient computer system for the user. If the message sending information or the recipient request indicates that the message is to be sent in an encrypted fashion, the Message Tracker can ensure that this takes place by performing the encryption. When the Message Tracker satisfies a request to review a stored message or receives a notification that such review has taken place, the Message Tracker updates information in the Message Tracking Table to reflect the information. Similarly, when the Message Tracker receives a message action instruction from a recipient such as to save or delete a message, the Message Tracker updates the Message Tracking Table to reflect the information.

The Message Tracker component will also monitor the messages to determine when it is no longer necessary to store a message. For example, if all recipients have reviewed the message and none have instructed that the message be saved (or in an embodiment where the default is to save the message and all recipients have indicated to delete the message), the Message Tracker can delete the stored message. Alternately, if a maximum time expiration period for the message has ended, the Message Tracker may delete the message even if all recipients have not reviewed the message or have indicated to save the message. When the single copy of the stored message is deleted, the Message Tracker also removes the entry for the message from the Message Tracking Table or otherwise indicates that the message is no longer to be monitored. In some embodiments, the Message Tracker can also receive requests from non-recipient users related to the stored messages (e.g., a request from a network administrator to delete a message or from a recipient's supervisor to review a message), and will satisfy the request when appropriate.

Those skilled in the art will appreciate that computer systems 100 and 150 are merely illustrative and are not intended to limit the scope of the present invention. For example, some recipient computer systems may have only one, but not both, of the Message Sender and Message Receiver components. Similarly, the Message Distributor and Message Tracker components may execute on separate computer systems. In addition, a variety of encryption mechanisms are available, and one or more of these encryption mechanisms could be used by the MDS system. Other operations on the message can also be performed with the MDS system, such as compressing messages when stored and/or transmitted. The computer systems may contain additional components or may lack some illustrated components. Accordingly, the present invention may be practiced with other computer system configurations.

As an illustrative example of a Message Tracking Table, consider Message Tracking Table 127 shown in FIG. 2. The illustrated Message Tracking Table contains an entry for each electronic message that is to be distributed to one or more recipients, and contains various message sending information and message access information. In particular, in the illustrated embodiment, each entry contains a unique identifier for the message, the time that message indicators for the message were sent to the recipients, a maximum expiration time period, and status information for each recipient of the message as to whether the recipient has reviewed the message and has indicated to save the message. In the illustrated embodiment, the default is to save a message unless the recipients explicitly instruct that the message is to be deleted.

As is shown in the Message Tracking Table, a message indicator for message 1 was sent to recipients ABC, BCD, and CDE at 8:15 a.m. on the specified date. The recipient status information for message 1 indicates that recipients BCD and CDE have reviewed the message (e.g., by using the received message indicator to retrieve the message), and that of the two only recipient CDE has indicated that the message is to be saved. For example, BCD may have explicitly instructed that the message be deleted and CDE may not have indicated any explicit save or delete instruction. As indicated, recipient ABC has not yet reviewed message 1. Similarly, the message sending information for message 2 that is stored in the Message Tracking Table indicates that a message indicator was sent to recipients ABC and XYZ at 13:37 hours on the indicated date. Recipient status information indicates that both recipients have reviewed the message, and that recipient XYZ has indicated that the message is to be saved. The maximum expiration time period for message 2 indicates that two weeks after the message indicators are sent, the message is to be deleted (even if recipient XYZ has indicated that the message is still to be saved).

Those skilled in the art will appreciate Message Tracking Table 127 is merely illustrative. For example, the Message Tracking Table could contain information related to whether the message and/or message indicator is to be encrypted or not when transmitted, and could include recipient-specific information that indicates access information such as the time and duration of each message access. In addition, message sending information could be used to restrict access to the message, such as allowing each recipient to review the message only a certain number of times or only when another recipient is not reviewing the message.

Figure 3:
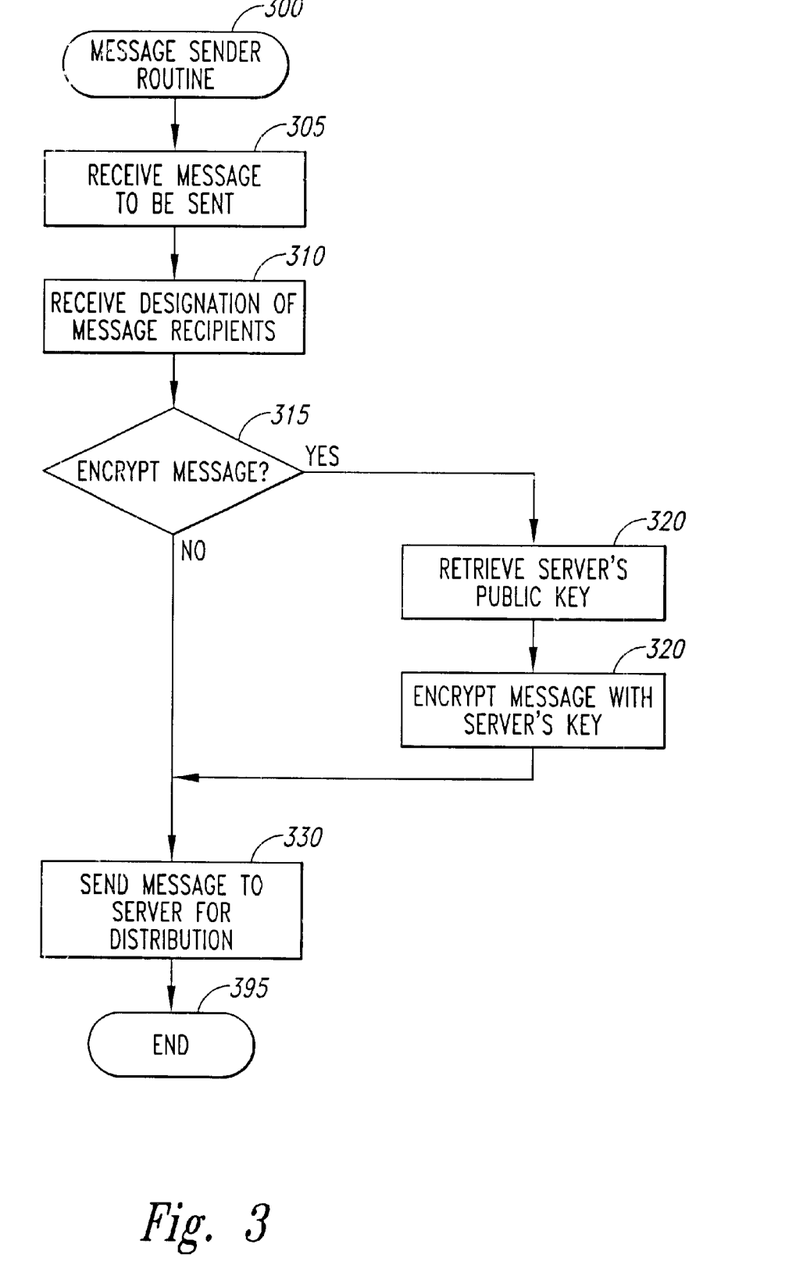
FIG. 3 is an exemplary flow diagram of an embodiment of the Message Sender routine.

FIG. 3 is an exemplary flow diagram of an embodiment of the Message Sender routine 300. The Message Sender routine allows a user to designate an electronic message to be sent and to designate recipients for the message, to indicate whether the message and message indicators are to be encrypted when sent, and then sends the message to the MDS system for distribution. The routine begins at step 305 where a message to be sent is received. The routine continues at step 310 where the recipients for the message are indicated by the user. In step 315 it is determined whether the user has indicated to encrypt the message. If so, the routine continues at step 320 to retrieve the public encryption key for the MDS system and then to encrypt the message with the key in step 320. After step 320, or if it was determined in step 315 that the message is not to be encrypted, the routine continues at step 330 where the message is transmitted to the MDS system for further distribution. The routine then ends in step 395. Those skilled in the art will appreciate that the Message Sender routine could be modified in a variety of ways, such as by allowing the sender to specify additional message sending information (e.g., a maximum expiration period) for all recipients or on a recipient-specific basis.

Figure 4:
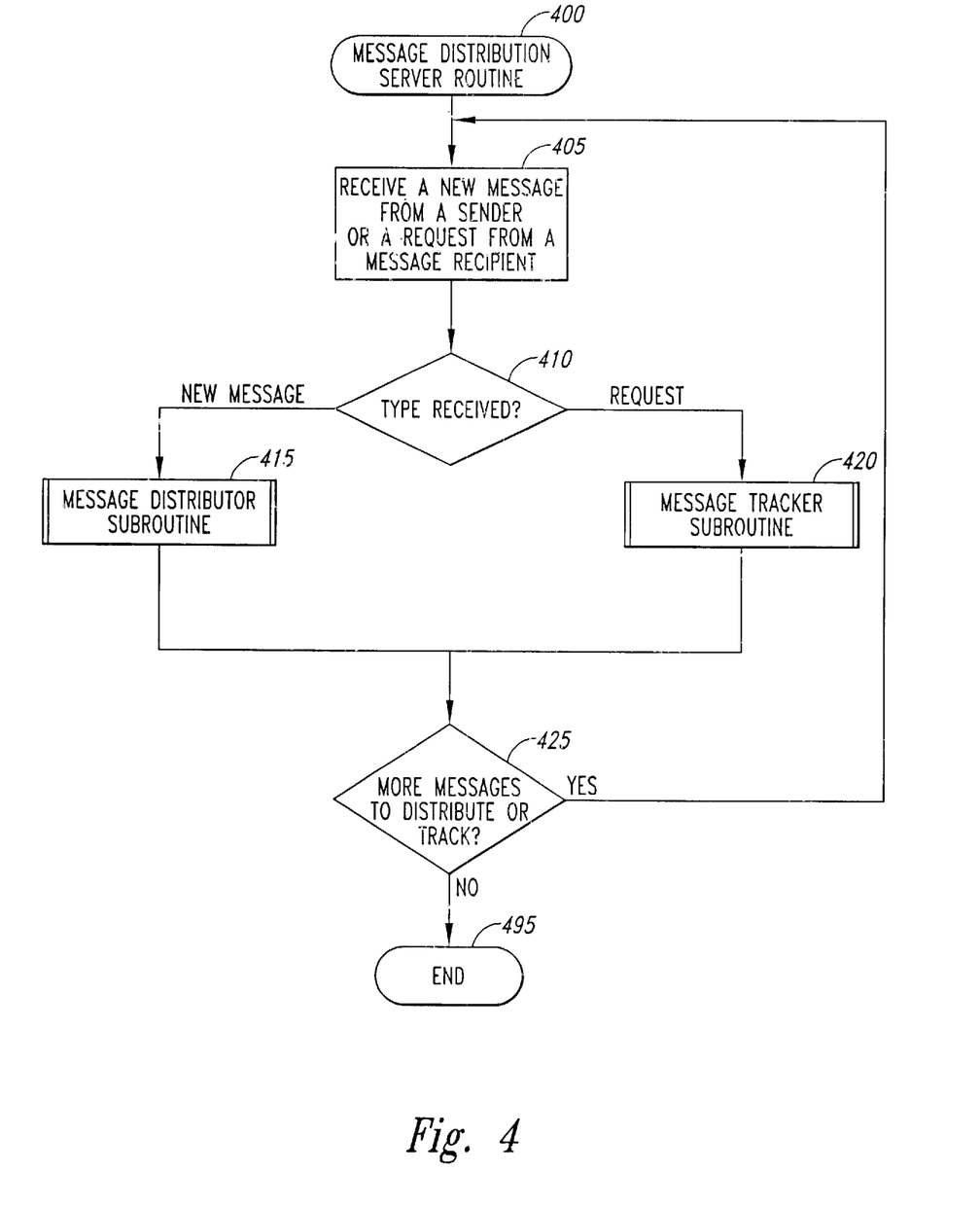
FIG. 4 is an exemplary flow diagram of an embodiment of the Message Distribution Server routine.

FIG. 4 is an exemplary flow diagram of an embodiment of the Message Distribution Server routine 400. The Message Distribution Server routine receives new messages to be distributed to one or more recipients as well as requests or instructions from recipients to access or manipulate stored messages. The routine begins at step 405 where a new message is received from a sender or a request is received from a message recipient. The routine continues at step 410 to determine whether a message or a request was received. If a new message was received from a sender, the routine continues at step 415 where the Message Distributor subroutine is executed to forward the message to the appropriate recipients. If it is instead determined in step 410 that a request from a message recipient was received, the routine continues at step 420 where the Message Tracker subroutine is executed to process the request. After steps 415 or 420, the routine continues at step 425 to determine if there are more messages to distribute or requests to track. If so, the routine returns to step 405, and if not the routine ends at step 495.

Figure 5:
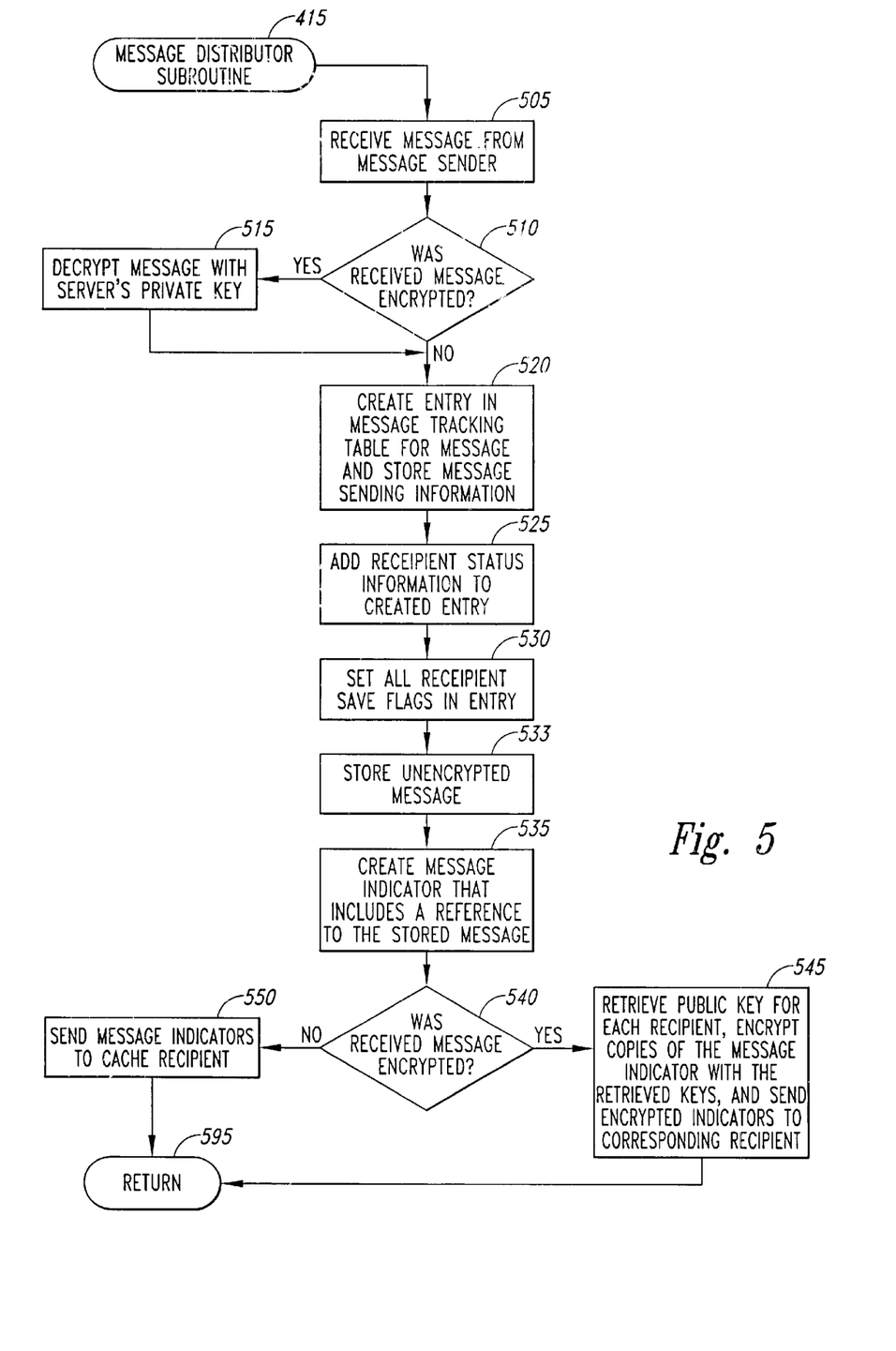
FIG. 5 is an exemplary flow diagram of an embodiment of the Message Distributor subroutine.

FIG. 5 is an exemplary flow diagram of an embodiment of the Message Distributor subroutine 415. The Message Distributor subroutine receives a message to be distributed to one or more recipients, decrypts the message if necessary, sends an appropriate message indicator to each recipient, and records information related to the message in the Message Tracking Table. The subroutine begins at step 505 where a message is received from a Message Sender. The subroutine continues at step 510 to determine if the received message is encrypted, and if so continues at step 515 to decrypt the message with the server's private key. After step 515, or if it was determined in step 510 that the received message was not encrypted, the subroutine continues at step 520 to create an entry in the Message Tracking Table for the message. Information about the message, including message sending information, will be stored. After step 520, the subroutine continues at step 525 to add information for each recipient to the entry created in the Message Tracking Table, and in step 530 sets save flags for each recipient to indicate that the default behavior is for the message to be saved. At step 533, the subroutine then stores a single copy of the message.

The subroutine then continues to step 535 to create a message indicator that includes a reference to the message. The indicator can also contain a variety of types of information about the message. In the illustrated embodiment, each recipient receives the same message indicator with subject and sender information, while in alternate embodiments different recipients can receive different indicators. The subroutine then continues at step 540 to determine whether the message when received was encrypted. In the illustrated embodiment, the Message Distributor subroutine determines to send out message indicators in an encrypted form if the message was received encrypted. Those skilled in the art will appreciate that a determination of whether to encrypt the message indicators could be made in a variety of other ways, such as encrypting all message indicators, using instructions from the sender, or accessing stored preference information for the recipients. If it is determined in step 540 that the received message was encrypted, the subroutine continues at step 545 to retrieve the public key for each recipient, encrypt a copy of the message indicator with the retrieved key, and send the encrypted message indicators to the appropriate recipients. If it was instead determined in step 540 that the received message was not encrypted, the subroutine continues at step 550 to send an unencrypted message indicator to each recipient. After step 540 or step 545, the subroutine continues to step 595 and returns.

Figure 6:
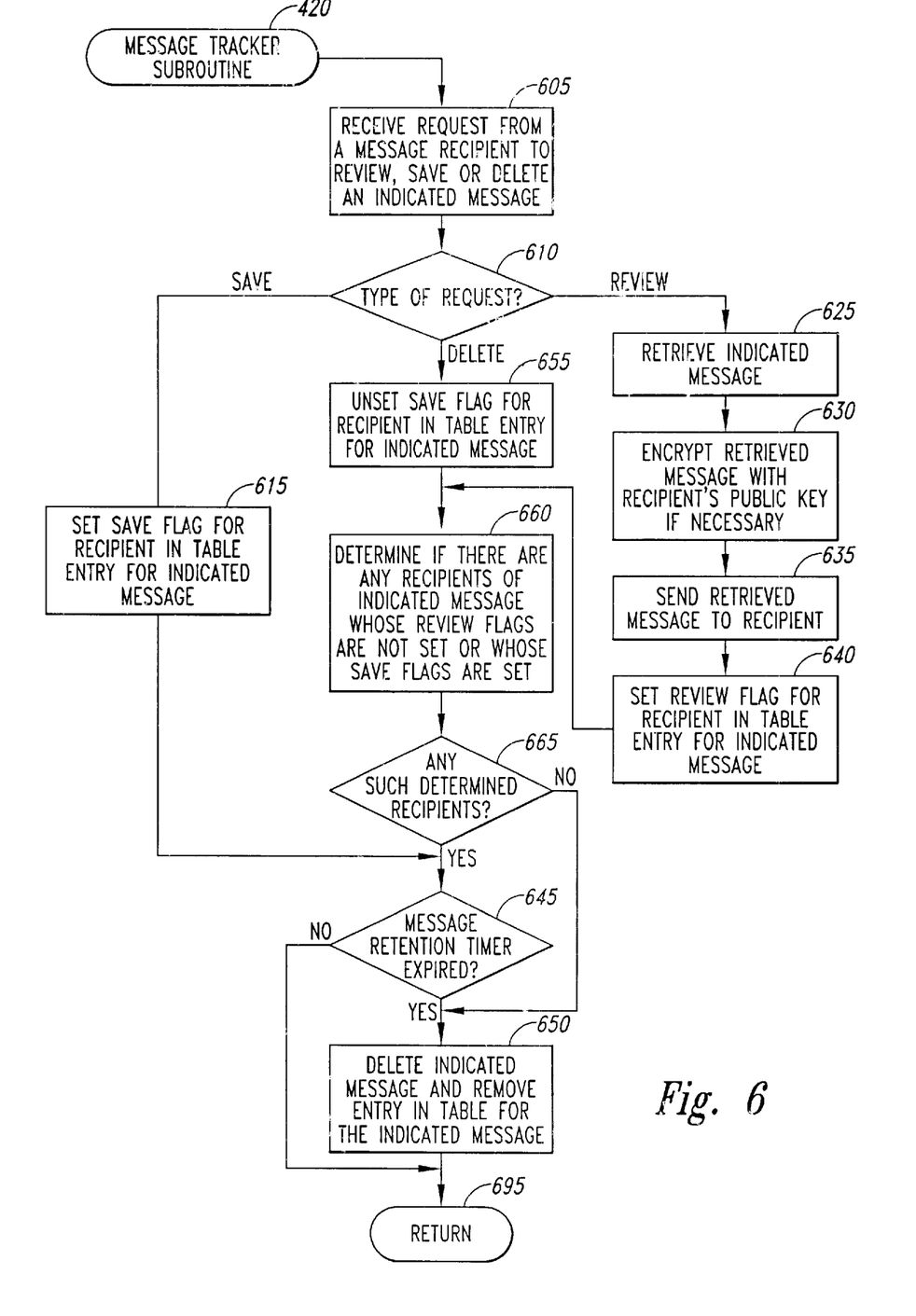
FIG. 6 is an exemplary flow diagram of an embodiment of the Message Tracker subroutine.

FIG. 6 is an exemplary flow diagram of an embodiment of the Message Tracker subroutine 420. The Message Tracker subroutine receives requests from message recipients to review, save, or delete indicated messages, and performs the action if appropriate. In the illustrated embodiment, the default is to save messages, even after they are reviewed, unless the user explicitly indicates to delete the message. In addition, the subroutine monitors any expiration period for the messages, and deletes a message if the expiration period has ended. The subroutine begins at step 605 where a request is received from a message recipient to review, save, or delete an indicated message. The subroutine continues at step 610 to determine the type of request. If the request is to save an indicated message, the subroutine continues at step 615 to set the save flag for the recipient in the table entry for the indicated message. If the request is instead to review the message, the subroutine continues at step 625 to retrieve the indicated message. The subroutine then determines in step 630 whether the original message from the sender was encrypted, and if so, it encrypts the retrieved message with the recipient's public key. The subroutine then continues at step 635 to send the message to the recipient, and in step 640 sets the review flag for the recipient in the table entry to indicate that the message has been reviewed.

If it is instead determined in step 610 that the request was to delete a message, the subroutine continues at step 655 to unset the save flag for the recipient in the table entry. After steps 655 or 640, the subroutine continues to step 660 to determine if there are any recipients of the indicated message whose review flags are currently not set (i.e., who have not reviewed the message) or whose save flags are set (i.e., have not indicated to delete the message). If all recipients have reviewed the message and none have indicated that the message is to be saved, the message can be safely deleted. Thus, if it is determined in step 665 that there are not any such determined recipients, the subroutine continues at step 650 to delete the indicated message and remove the entry in the table for the message. If it was instead determined in step 665 that such determined recipients did exist, or after step 615, the subroutine continues at step 645 to determine if a message retention timer based on the message expiration period has expired. If so, the subroutine continues at step 650 to delete the message. If not, or after step 650, the subroutine continues at step 695 to return. Those skilled in the art will appreciate that the Message Tracker subroutine could use other factors when determining whether or not to delete a message or could process other requests such as to forward a message to other recipients and that other default behaviors could be used.

Figure 7:
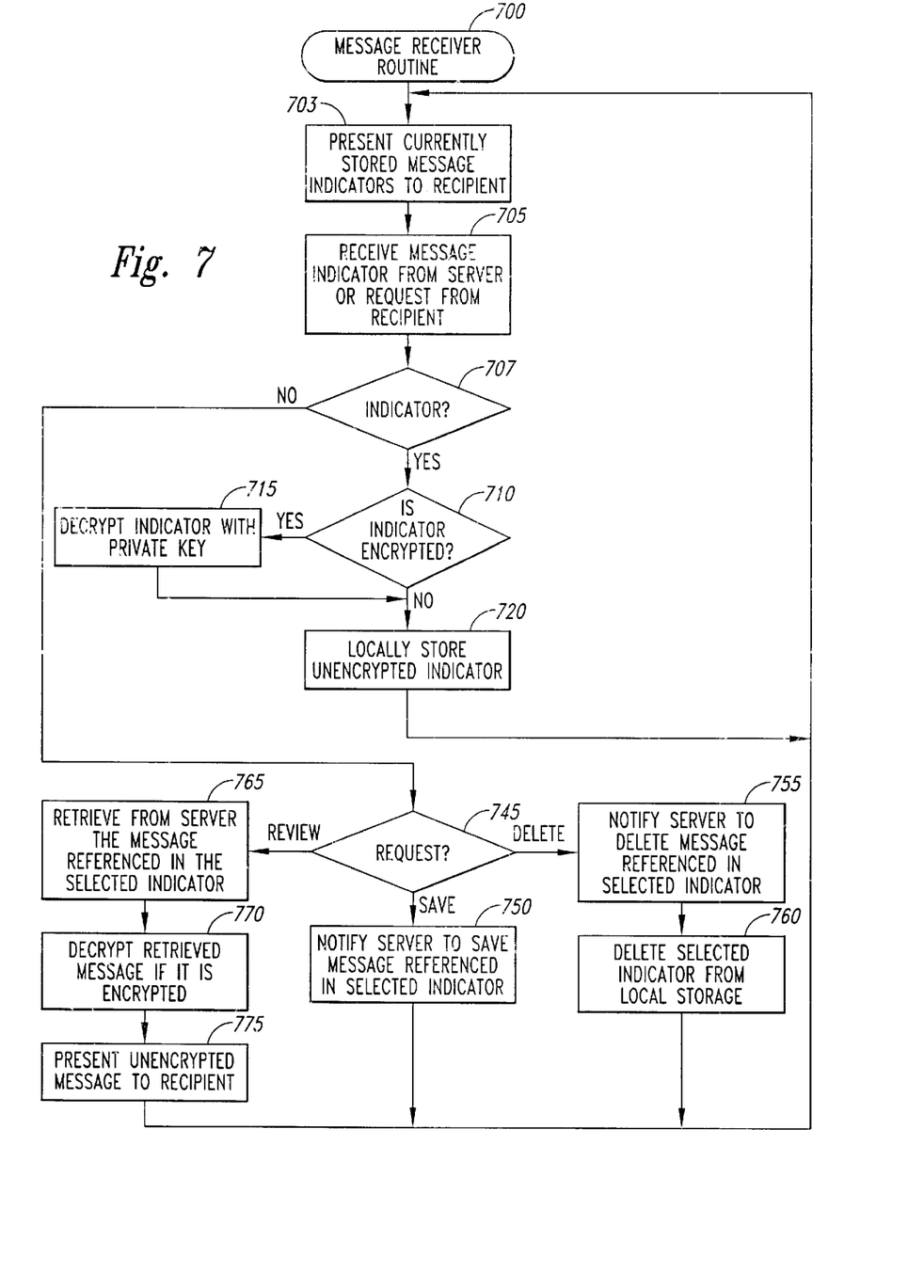
FIG. 7 is an exemplary flow diagram of an embodiment of the Message Receiver routine.

FIG. 7 is an exemplary flow diagram of an embodiment of the Message Receiver routine 700. The Message Receiver routine receives message indicators from the MDS system, decrypts the indicators when necessary, stores the indicators, presents the currently stored indicators to the recipient, receives requests from the recipient related to the messages corresponding to the indicators, and forwards the requests to the MDS system. The routine begins at step 703 where any currently stored message indicators are presented to the recipient. The routine then continues to step 705 where a message indicator is received from the MDS system or a request is received from the recipient. The routine continues to step 707 to determine if a message indicator was received. If so, the routine continues to step 710 to determine if the indicator is encrypted. If the indicator is encrypted, the routine continues at step 715 to decrypt the indicator with a private key for the recipient. After step 715, or if it was determined that the indicator was not encrypted, the routine continues at step 720 to locally store the unencrypted indicator. The routine then returns to step 703 to present the currently stored indicators.

If it was instead determined in step 707 that a request was received from the recipient, the routine continues to step 745 to determine if the request was to review, save, or delete the message corresponding to a selected indicator. If the request is to save the message corresponding to the indicator, the routine continues to step 750 to notify the MDS system that the corresponding message is to be saved. If the request is instead to delete the message corresponding to the indicator, the routine continues at step 755 to notify the MDS system to delete the corresponding message. The routine then continues at step 760 to delete the selected indicator from local storage. In some embodiments, the indicator will not be deleted, but the display of available indicators will instead change (e.g., the indicator will not be visible or will be grayed out). In these embodiments, if the message continues to be stored by the MDS system, the recipient may later be able to indicate that they now want to review the message or that the message is to be saved. Alternately, if the MDS system determines that the message is no longer accessible to the user (e.g., the user has exceeded a maximum number of times they are allowed to access the message), the MDS system can notify the Message Receiver to delete the indicator for the message or change the display of indicators so that the indicator is no longer available. In other embodiments in which the indicator is immediately deleted, the message may not be available to the recipient even if it is still stored by the MDS system.

If it was instead determined in step 745 that the request is to review the message corresponding to the indicator, the routine continues at step 765 to notify the MDS system that the message is to be reviewed and to receive in response the message from the MDS system. The routine then continues to step 770 to decrypt the retrieved message if necessary with the recipient's private key, and then to step 775 to present the unencrypted message to the recipient for review. After steps 750, 760, or 775, the routine returns to step 703 to present the currently stored indicators.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for securely sending an electronic message to multiple recipients, the method comprising:
    (a) receiving an indication of an encrypted electronic message to be sent to multiple recipient users;
    (b) automatically storing a single copy of the electronic message;
    (c) creating a notification electronic message including a reference to the electronic message;
    (d) sending a copy of the notification electronic message to each of the recipient users; and
    upon receiving a request from a recipient user for the referenced electronic message,
    (e) decrypting the received encrypted electronic message;
    (f) retrieving an encryption key for the recipient user;
    (g) encrypting a copy of the decrypted electronic message with the retrieved encryption key; and
    (h) sending the encrypted copy to the recipient user for temporary storage while the sent encrypted copy is reviewed; and
    (i) making a determination selected from the group consisting of: whether the encrypted copy of the electronic message has been sent to all of the recipient users and whether none of the recipient users have indicated that the electronic message is to be saved, and automatically deleting the stored single copy of the electronic message if the determination is true.

2. The method of claim 1 including:
    under the control of the server, when it is determined that an encrypted copy of the electronic message has been sent to all of the recipient users, deleting the stored single copy of the electronic message.

3. The method of claim 1 including:
    under the control of the server, when it is determined that an encrypted copy of the electronic message has been sent to all of the recipient users and that none of the recipient users have indicated that the electronic message is to be saved, deleting the stored single copy of the electronic message.

4. The method of claim 1 including:
    under the control of the server, when it is determined that a specified period of time after the sending of the notification electronic messages has expired, deleting the stored single copy of the electronic message.

5. The method of claim 1 wherein contents of the notification electronic message consist of the reference to the received electronic message, an identification of a sender of the electronic message, and a subject of the electronic message.

6. The method of claim 1 including retrieving message sending instructions for a recipient user, and wherein the sending of the copy of the notification electronic message to that recipient user is performed according to the message sending instructions.

7. The method of claim 6 wherein the retrieved message sending instructions specify types of information to be included in the notification electronic message sent to that recipient user, and wherein the copy of the notification electronic message to be sent to that recipient user includes the specified types of information.

8. The method of claim 1 wherein for at least one recipient user, before the copy of the notification electronic message is sent to the at least one recipient user, the copy is encrypted with the encryption key for the at least one recipient user.

9. The method of claim 1 wherein the recipient user is unable to permanently store the electronic message.

10. The method of claim 1 wherein steps (a)–(h) are performed under control of a server computer, and including:
    before the receiving of the indication, under control of a sending computer,
    receiving an indication of the electronic message;
    retrieving an encryption key for the server computer, the server encryption key distinct from the retrieved encryption key for the recipient user;
    encrypting the electronic message with the retrieved server encryption key; and
    sending the encrypted electronic message to the server computer.

* * * * *